X400

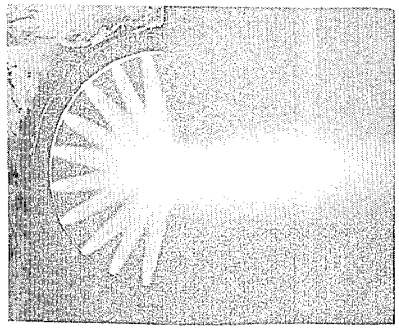
FIG.IA
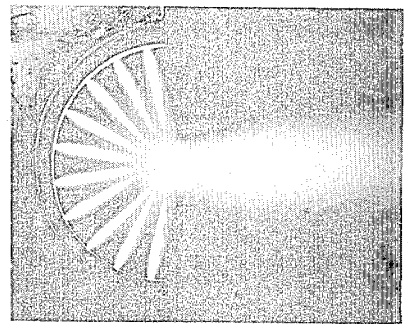
FIG.IB
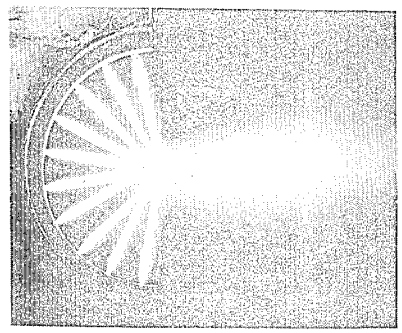
FIG.IC
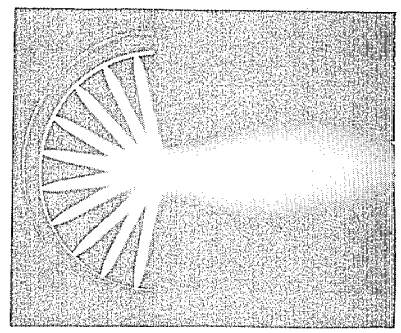
FIG.ID

X400

X100

3,618,197
BUTT-WELDING LARGE-DIAMETER STEEL BARS

Yoshinori Ito, Nishinomiya-shi, Japan, assignor to Sumitomo Metal Industries Ltd., Kitahama, Higashi-ku, Osaka, Japan
Filed Sept. 24, 1969, Ser. No. 860,771
Claims priority, application Japan, Sept. 25, 1968, 43/69,608
Int. Cl. B23k *31/02, 35/38*
U.S. Cl. 29—494                                    2 Claims

ABSTRACT OF THE DISCLOSURE

A process for butt-welding large-diameter steel bars having diameters of at least 30 mm., comprising the steps of applying a sufficient pressure to two pieces of a steel bar in abutting relationship for pressure welding, while heating the parts to be joined to the welding temperature with a sufficiently strong reducing hydrocarbon-oxygen flame for deposition of carbon on the steel surfaces, switching this reducing flame over to a neutral flame, and then continuing the pressure application with a reduced pressure.

---

This invention relates to pressure welding of steel materials, and more specifically to gas pressure welding of steel bars having diameters of approximately 30 millimeters or upwards.

Known methods for joining these steel bars together include flash butt welding, enclosed arc welding, gas pressure welding, and thermit welding.

Flash butt welding, which is performed on an automatic welding machine, is advantageous because the welding can be carried out quickly and uniformly regardless of the skill of the operator. For the welding of such large-diameter bars for which the present invention is intended, however, the method is not adapted in field operation because it requires a large-capacity power source and necessitates the movement of the heavy equipment.

Enclosed arc welding calls for a high degree of skill for the operation and is apt to produce defective joints of bars upon welding in the vertical position. These difficulties are combined again with the necessity of an electric source to make the method unsuitable for on-the-site welding operation.

Thermit welding may be used at any place, but the advantage is offset by the low reliability due to frequent production of defective welds.

Gas pressure welding is by far the more advantageous economically than any of the conventional techniques above mentioned because it does not require any electric power source but can be effected with a gas cylinder and a simplified pressure apparatus. The method is in wide use for joining bars of small diameters.

However, the method when applied to the joining of bars about 30 mm. or more in diameter tends to form an oxide over the abutting areas of parts to be joined, and the oxide may in turn lead to a defect in the resulting weld.

It is an object of the present invention to provide a process for completely joining together steel bars having such large diameters of more than about 30 mm. and which are free from any defect, with the use of an extremely simplified equipment.

Another object of the invention is to provide a gas pressure welding process whereby steel bars about 30 mm. or more in diameter can be perfectly welded together without any possibility of defect.

A further object of the invention is to provide a gas welding process in which the forming of an oxide over the surface of parts to be pressure welded is avoided so as to give a welded joint having excellent strength.

These objects are realized by a process in accordance with the present invention wherein the abutting areas of bar pieces to be joined together are pressure welded while being heated with a strong reducing flame and, when the pieces have been joined together with pressure, the flame is switched over to a neutral flame.

While a given gaseous hydrocarbon burner may be adopted for the welding according to the invention, the acetylene-oxygen burner is most preferred. Therefore, the present invention will be described in further detail hereunder, as operated with an acetylene-oxygen burner, with reference to the accompanying drawings.

In the drawings:

FIGS. 1A to 1D are photographs illustrative of the flame conditions for use in welding;

Gas pressure welding usually consists in cleaning and abutting the ends of two pieces of bar to be joined together, heating the abutting areas of the parts to be joined with an acetylene-oxygen burner to a welding temperature which is usually about 1200° C., and then joining the parts together with a pressure of about 600 kg./cm.$^2$ while they are being heated.

The heating of the abutting areas is usually effected by a ring burner which comprises at least eight annularly-disposed tips. And a common practice is that the flame to be injected out of the tips is neutral as indicated in FIG. 1A. In the present invention, by contrast, an incompletely-burnt reducing flame is used in the first step of welding. To be more definite, the flame for use in the first step of the present process is such a strong reducing flame that the white cone of the individual sub-flame from the multiflame tips ranges in length longer than three-fourths but shorter than one and a half of the radium R of the ring burner.

This strong reducing flame is obtained by controlling the flow ratio of acetylene and oxygen to be supplied to the burner in the range of 1.3:1 to 2.0:1.

When subjected to this strong reducing flame, the abutting areas of parts to be joined are heated to a pressure welding temperature of about 1200° C. and a carbon film formed by the incomplete combustion of acetylene gas deposits on the steel surfaces. As the heating progresses, the carbon gains entrance into the steel, thus causing carburization of the parts being joined. During the heating operation the ring burner is oscillated to and fro axially of the bar to ensure uniform heating.

In the present invention, the two pieces of bar in an abutting relation during the heating by the strong reducing flame are held under a primary welding pressure which is usually in the range of 530 to 650 kg./cm.$^2$. Thus, when the welding temperature has been reached, the abutting ends bulge and the two pieces are joined together.

Under the invention, when the two pieces have been welded in this way, the strong reducing flame is switched over to an ordinary neutral flame, and the pressure is reduced to a range usually between 180 and 280 kg./cm.$^2$.

By the heating with the neutral flame the deposited carbon is thoroughly diffused into the base metal to form a joint of good ductility.

Figure 2:
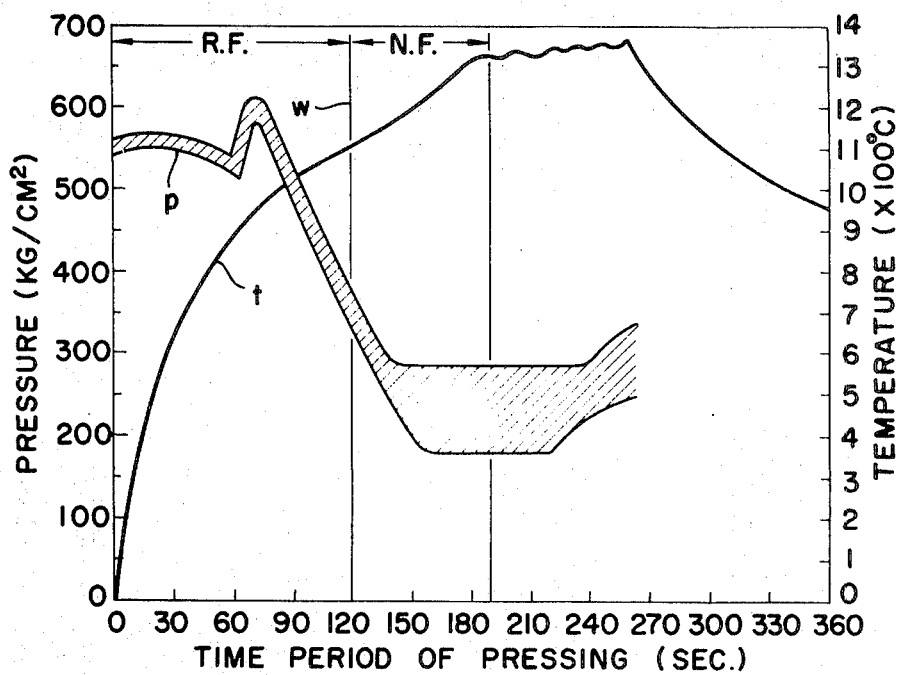
FIG. 2 is a graph in which the kinds of flames, and changes of pressure and temperature in the process of the invention are plotted against time.

The operation for the process of the invention is performed in accordance with the schedule given in FIG. 2. Two pieces of a steel bar, 50 mm. in diameter, with cleaned ends abutted to each other are held under pressure which is varied as indicated by the curve $p$. Symbol $t$ signifies the temperature change on the surfaces to be joined. R.F. represents the period for which the abutting areas are heated with a strong reducing flame, and N.F. represents the period for which the joint so formed is heated with a neutral flame. Indicated at $w$ is the point of time when the two work-pieces are joined together. The actual welding is presumed to take place within a period of 60 seconds around this point.

On completion of heating with the neutral flame, the pressure is raised again to a value between 180 and 280 kg./cm.$^2$, and then the joint is cooled to obtain a welded product.

Importantly, the process of the invention is characterized by the use of strong reducing flame in the first step heating for the deposition of reduced carbon on the abutting surfaces to be joined. The carbon deposited in this manner avoids the formation of any oxide inclusion on the parts to be joined and ensure perfect jointing.

By the same token, the deposited carbon penetrates through the steel surface to achieve carbourization and diffuses inwardly on heating with the neutral flame, thereby rendering the joint sufficiently ductile.

The amount of carbon to be deposited depends on the flow ratio of acetylene and oxygen. If the flow rate of acetylene is 1.3 or less on the basis of the flow rate of oxygen which is 1, where the length of white cone in the flame is not more than three-fourths of R, then the formation of oxides on the abutting areas to be joined cannot be adequately prevented. Conversely if the ratio is 2.0 or more to 1, the deposition of carbon and the carburization take place to excess with the result that the joint is embrittled and a protracted heating up to the welding temperature is necessitated because of the too low flame temperature. The most preferred acetylene:oxygen flow ratio range is from 1.5:1 to 1.7:1.

Figure 3:
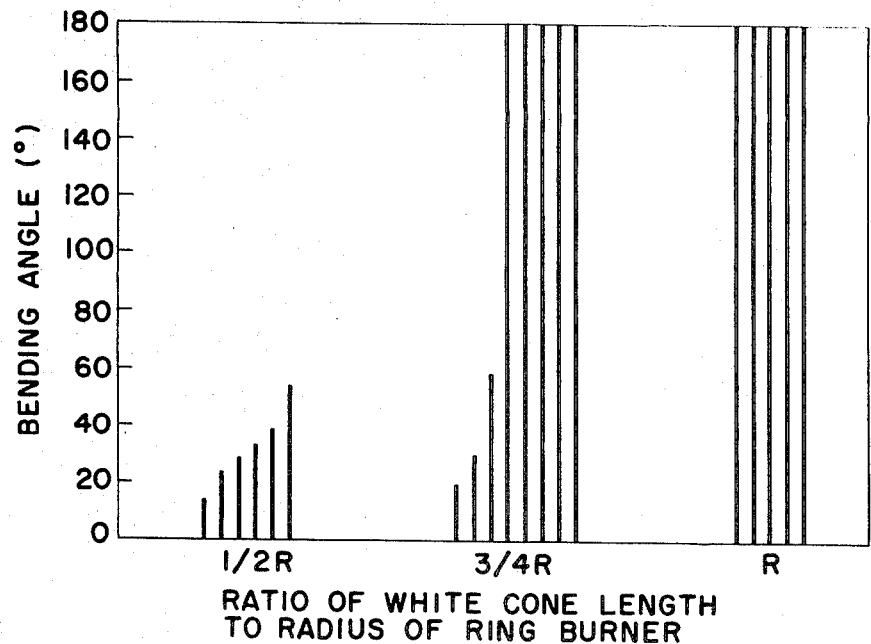
FIG. 3 is a graph showing the relationship between the flame conditions and ductility on bending of welded bars.

FIG. 3 shows the results of the bending test carried on the test pieces taken from the welded steel bars using various reducing flame. The diameter of the bending bar is 3 times the diameter of the test piece, that is 120 mm.

Figure 4A:
FIGS. 4A to 4C are microphotographs of the structures of welds indicating the influence of the size of white cone in gas flame upon the weld quality.
Figure 4B:
Figure 4C:

FIG. 4A shows the microphotostructure of a weld formed with flame in which the length of the white cone was equivalent to the radius R of the ring burner used. FIG. 4B shows the microphotostructure of a weld where the white cone length was equivalent to three-fourths of R. This microphotostructure shows that the amount of inclusion is remarkably reduced compared with conventional method, but extremely small amount of inclusion can be seen. Then the white cone length shall preferably be longer than three-fourths of R. FIG. 4C shows the microphotostructure of a weld where the white cone length was equivalent to 1¼ to 1½ of R. The photographs evidence that welds free from oxide inclusion can be obtained by the process according to the present invention.

This invention is illustrated by the following examples.

EXAMPLE 1

Two pieces of 50 mm.-dia. steel bar (containing 0.24% C, 0.15% Si and 0.23% Mn) were abutted with a maximum gap of 2 mm. between the end areas to be pressure welded with heat. The two pieces were then joined together using a ring torch having an inside diameter of 100 mm. and which was provided with 20 tips each 0.9 mm. in diameter, and thereby forming a strong reducing flame with an acetylene: O$_2$ gaseous flow ratio of 1.6:1 (the acetylene gas being supplied at a pressure of 0.25 kg./cm.$^2$ thereby the white cone length being equal to R). With a primary butt-welding pressure of 550 kg./cm.$^2$ the abutting parts were heated for about 2 minutes, and then the flame was switched over to neutral flame and the pressure was reduced to 250 kg./cm.$^2$, when a welded joint resulted. Next, the welded bar was machined to a diameter of 40 mm., and test pieces prepared in this manner were subjected to tensile and bending tests. Test pieces were also made under the same conditions except that a neutral flame was used throughout the welding operation, and were tested in the same way. The results were as given in Table 1.

TABLE 1

| Pressure welding process | Tensile properties | | Average bend angle (°) (of 10 pcs.) |
|---|---|---|---|
| | Yield point (kg./mm.$^2$) | Tensile strength (kg./mm.$^2$) | |
| Ordinary process (w/neutral flame) | 28.6 | 47.7 | 87 |
| Present process | 29.0 | 48.2 | 180 |

Referring to Table 1, the test pieces according to the ordinary process and the process of the invention, when subjected to the tensile test, invariably ruptured in the base metal. However, in the bending test, the specimens according to the present process all exhibited good ductility as they withstood bending up to 180°, whereas 70 percent of the ordinary test pieces were broken at the welded joint.

EXAMPLE 2

Two pieces of 41 mm. dia. deformed bar of high tension steel (SD40 steel, containing 0.25% C, 0.38% Si, 1.55% Mn, and 0.06% V) were held with a maximum gap of 4 mm. between the parts to be pressure welded with heat. The same torch as adopted in Example 1 was employed.

As the primary heating flame, a strong reducing flame of acetylene gas and O$_2$ gas at a flow mixing ratio of 1.7:1 (at an acetylene gas pressure of 0.3 kg./cm.$^2$ thereby the white cone length was equivalent to 1¼ R) was used. With a primary pressure of 550 kg./cm.$^2$, the abutting parts were heated for 2 minutes. The flame was then switched over to a neutral flame and the pressure was reduced to 250 kg./cm.$^2$. The welded bar thus formed was machined to a diameter of 33 mm., and test pieces prepared in this manner were subjected to a bending test. Likewise, test pieces were prepared using a neutral flame alone and were tested in the same way. The results are shown in Table 2.

TABLE 2

| Pressure welding process | Test piece | Bend angle (°) 10-pcs. average) |
|---|---|---|
| Ordinary process | As pressure welded | 63 |
| Do | Machined to 33 mm./φ | 34 |
| Present process | As pressure welded | 180 |
| Do | Machined to 33 mm./φ | 180 |

Concerning the results given in Table 2, it was noted that all of the welded specimens according to the conventional process broke at the joint, in contrast to those according to the present process which showed good ductility with resistance to bending up to 180° C. This evidences the outstanding pressure welding effect that is achieved by the process of the invention.

EXAMPLE 3

Two pieces of 50 mm.-dia. bar of high tension steel (containing 0.26% C, 0.37% Si, 0.15% Mn, and 0.06% V) were held in abutting relationship with a maximum gap of 5 mm. in between, heated for 2 minutes with a primary flame of acetylene and oxygen at a flow of 1.7:1 (at an acetylene gas pressure of 0.3 kg./cm.$^2$ thereby the white cone length being equivalent to 1¼ R) from the same torch as used in Example 1 and at a primary pressure of 550 kg./cm.$^2$, and then the flame was changed over to a neutral one, followed by a reduction of the pressure to 250 kg./cm.$^2$. A welded joint resulted.

This welded bar was machined to a diameter of 40 mm. Test pieces prepared in this manner were subjected to tensile and bending tests.

Similar tests were conducted with test pieces of the bar welded in the same way as above except that a neutral flame was employed throughout. The results are shown in Table 3.

TABLE 3

| Pressure welding process | Tensile properties | | Bend angle (°) (average) |
|---|---|---|---|
| | Yield point (kg./mm.$^2$) | Tensile strength (kg./mm.$^2$) | |
| Ordinary process | 47.8 | 66.9 | 26 |
| Present process | 48.3 | 67.6 | 180 |

In connection wth the results of tensile tests given in Table 3, it was found that all of the test pieces according to the conventional and present processes broke in the base metal portions. In the bending test, however, the test pieces according to the present process all displayed good ductility on bending up to 180°, while those of the ordinary process were invariable broken in the joint.

EXAMPLE 4

Two pieces of 50 mm.-dia. steel bar of a chemical composition as tabulated hereunder were pressure welded with an oxyacetylene flame from a ring torch having 20 tips. The ratio of the length of white cone of the primary gas flame to the radius R of the tips was in the range of 1¼:1 to 1½:1.

TABLE 4.—CHEMICAL COMPOSITION AND MECHANICAL PROPERTIES OF 50 MM.-DIA. STEEL BAR

Chemical analysis(percent):

C _____ 0.25
    Si _____ 0.39
    Mn _____ 1.51
    P _____ 0.020
    S _____ 0.010
    Cu _____ 0.08
    Cr _____ 0.06
    V _____ 0.050

Yld. point (kg./mm.$^2$) _____ 45.3–47.7
Ten. Str. (kg./mm.$^2$) _____ 62.4–64.3
Elong. (percent) _____ 24.2–26.2

This gas pressure welded joint was machined to a diameter of 40 mm. and was tested for resistance against bending with a push rod, 120 mm. in diameter. The experiment was repeated except that a neutral flame was used throughout the welding cycle. The test results of the two types of test pieces were as tabled below.

process of the present invention as described in Example 2. It is clear from these photographs that none of the welded pieces were broken by bending up to 180°.

However we found that the degree of cleanness of the edge surfaces to be welded will affect to the inclusion in the weld, then the edge surfaces shall be cleaned and free of any oxides. The effects of the cleanness of the edge surfaces on the properties of the weld were studied as follows:

Several pair of steel bar each having diameter of 50 mm. were welded according to the process of the present invention using reducing flame in which white cone length being 1¼ to 1½ R.

The edge surfaces of the steel bars are finished with various kinds of grinders shown in following table. The results obtained in this test are shown in Table 6.

TABLE 6

Kind of grinder:                  Bending angle before rupture, degrees
    Coarse grain grinder _____ 11
    Fine grain grinder _____ 48
    Sandpaper _____ 180

After bending fatigue tests with similar test pieces, it was found that welded bars according to the present process broke invariably in the base metal, whereas those conventionally joined with a neutral flame alone ruptured at the joint.

When a 50 mm.-dia. steel bar was pressure welded using a ring torch with 40 tips in two rows, the time required for the welding was curtailed from the usual period with the 20-tip torch by 40 seconds. With a 10-tip ring torch, the welding time was extended by 25 seconds instead.

If a torch of 7 or less tips is used, the sub-flames from the individual tips fail to cover the entire areas of the parts to be joined, thus giving rise to oxide inclusion.

While the present invention has so far been described as embodied with the use of oxyacetylene flame, it should of course be understood that the invention is not limited thereto but is applicable to other hydrocarbon gas flames such as propane-oxygen flame as well.

I claim:

1. A process for butt-welding large diameter steel bars having diameters of at least 30 mm. comprising the steps of placing the ends of two pieces of steel bar into abutting relationship; applying to said pieces of steel bar a sufficient pressure for pressure welding; forming a sufficiently hot reducing flame in a ring torch by burning a gaseous mixture of acetylene and oxygen with a flow ratio of acetylene to oxygen in the range of 1.3:1 to 2.0:1, said reducing flame having a white cone with a length in the TABLE 5.—RESULTS OF TENSILE TESTS ON JOINTS FORMED WITH FLAME HAVING WHITE CONE: RADIUS RATIO OF 1¼ : 1 TO 1½ : 1

| | Tensile property (gauge length=200 mm.) | | | |
|---|---|---|---|---|
| | Yield point (kg./mm.$^2$) | Tensile strength (kg./mm.$^2$) | Elongation (percent) | Broken part |
| Ordinary process (w/neutral flame) | 35.3 | 48.3 | 6.3 | Joint. |
| Present process | 45.9 | 64.7 | 18.7 | Base metal. |
| Base metal | 45.4 | 62.7 | 26.0 | |

Figure 5:
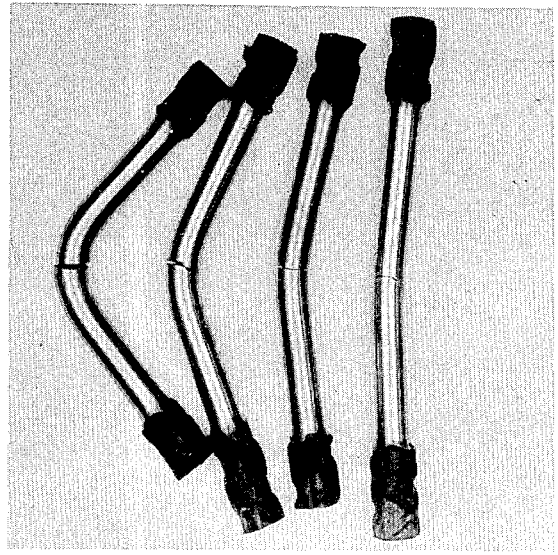
FIG. 5 is a photograph showing the results of bending tests on bars welded by a conventional gas pressure welding technique.

In FIG. 5 there are given photographs showing the results of bending tests of test pieces obtained with the use of a neutral flame only as mentioned in the above examples. Every photograph shows the test piece broken by bending.

Figure 6:
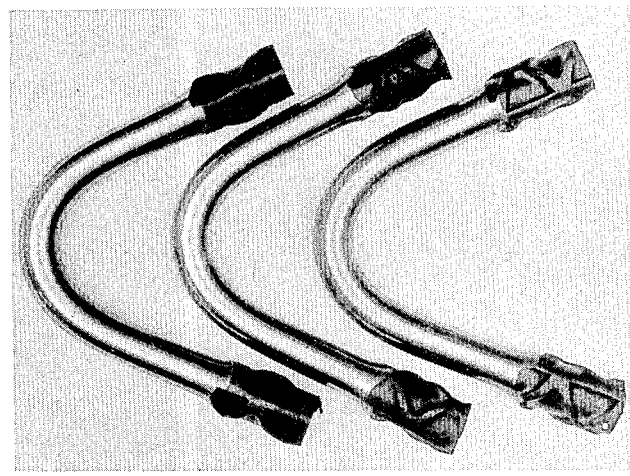
FIG. 6 is a photograph showing the results of bending tests on bars welded by the process of the invention.

In FIG. 6 are photographs showing the results of bending tests of test pieces formed in accordance with the range of three fourths to one and a half the radius of the ring torch; heating the pieces to be joined to the welding temperature by the application thereto of the hot reducing flame simultaneously with the application of said pressure; then switching said reducing flame to a neutral flame while simultaneously reducing the pressure applied upon completion of the weld.

2. A process according to claim 1 wherein upon completion of heating by said neutral flame the pressure is again raised and the weld allowed to cool.

References Cited
UNITED STATES PATENTS

| | | | |
|---|---|---|---|
| 1,943,123 | 1/1934 | Kreutz | 29—494 X |
| 2,174,628 | 10/1939 | Gerull | 29—494 |
| 2,196,191 | 4/1940 | Broadfield | 29—494 X |
| 2,295,702 | 9/1942 | Wissler | 29—494 X |
| 2,406,059 | 8/1946 | Burch | 29—486 X |
| 2,471,937 | 5/1949 | Colwell | 29—486 X |

OTHER REFERENCES

Welding Handbook, Section 2, 5th edition, edited by Arthur L. Phillips, pp. 21.2–21.5 and 22.2–22.22, published 1963.

Welding Metallurgy, vol. 1, by George E. Linnert, copyright 1965, pp. 128–131.

JOHN F. CAMPBELL, Primary Examiner

R. J. SHORE, Assistant Examiner

U.S. Cl. X.R.

29—486, 497.5, 498